US008506914B2

(12) United States Patent
Bara

(10) Patent No.: US 8,506,914 B2
(45) Date of Patent: Aug. 13, 2013

(54) N-FUNCTIONALIZED IMIDAZOLE-CONTAINING SYSTEMS AND METHODS OF USE

(75) Inventor: Jason E. Bara, Tuscaloosa, AL (US)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/430,813

(22) Filed: Mar. 27, 2012

(65) Prior Publication Data

US 2012/0248372 A1 Oct. 4, 2012

Related U.S. Application Data

(63) Continuation of application No. 61/468,314, filed on Mar. 28, 2011.

(51) Int. Cl.
*B01D 53/50* (2006.01)
*B01D 53/52* (2006.01)
*B01D 53/62* (2006.01)
*C09K 3/00* (2006.01)
*C10L 3/10* (2006.01)

(52) U.S. Cl.
USPC ..... 423/226; 423/228; 423/242.2; 423/242.6; 423/242.7; 422/168; 252/184; 252/189; 48/127.3; 48/127.5

(58) Field of Classification Search
USPC ................ 423/226, 228, 242.2, 242.6, 242.7; 422/168; 252/184, 189; 48/127.3, 127.5
See application file for complete search history.

(56) References Cited

U.S. PATENT DOCUMENTS

| 4,088,735 | A | * | 5/1978 | Bratzler et al. | ............... | 423/219 |
| 4,624,838 | A | * | 11/1986 | Pan et al. | ................. | 423/226 |
| 4,775,519 | A | * | 10/1988 | Yit Nieh | ................. | 423/226 |
| 7,744,838 | B2 | | 6/2010 | Davis, Jr. | | |
| 7,789,945 | B2 | | 9/2010 | Lechnick et al. | | |
| 7,790,012 | B2 | | 9/2010 | Kirk et al. | | |
| 2005/0010076 | A1 | | 1/2005 | Wasserscheid et al. | | |
| 2005/0129598 | A1 | | 6/2005 | Chinn et al. | | |
| 2007/0044658 | A1 | | 3/2007 | Rochelle et al. | | |
| 2008/0029735 | A1 | | 2/2008 | Gin et al. | | |
| 2008/0050296 | A1 | | 2/2008 | Tontiwachwuthikul et al. | | |
| 2009/0171098 | A1 | | 7/2009 | Bara et al. | | |
| 2009/0173693 | A1 | | 7/2009 | Gin et al. | | |
| 2009/0291872 | A1 | | 11/2009 | Bara et al. | | |
| 2009/0291874 | A1 | | 11/2009 | Bara et al. | | |
| 2010/0086983 | A1 | | 4/2010 | Gellett et al. | | |
| 2011/0014100 | A1 | | 1/2011 | Bara et al. | | |

(Continued)

FOREIGN PATENT DOCUMENTS

WO 2009076530 A1 6/2009

OTHER PUBLICATIONS

Shannon et al., Reactive and Reversible Ionic Liquids for CO2 Capture and Acid Gas Removal, Separation Sci. and Technol., 47:178-188 (2012).

(Continued)

*Primary Examiner* — Timothy Vanoy
(74) *Attorney, Agent, or Firm* — Meunier Carlin & Curfman, LLC

(57) ABSTRACT

Systems containing imidazoles or blends of imidazoles and amines are described herein. Methods of their preparation and use are also described herein. The methods of using the systems include the reduction of volatile compounds from gas streams and liquid streams.

43 Claims, 2 Drawing Sheets

(56) References Cited

U.S. PATENT DOCUMENTS

| | | | |
|---|---|---|---|
| 2011/0223087 A1* | 9/2011 | Lustig et al. | 423/228 |
| 2011/0256043 A1* | 10/2011 | Blair et al. | 423/228 |
| 2012/0294785 A1* | 11/2012 | Murai et al. | 423/210 |

OTHER PUBLICATIONS

Shannon et al., Properties of alkylimidazoles as solvents for CO2 capture and comparisons to imidazolium-based ionic liquids, Ind. Eng. Chem. Res., 50(14):8665-8677 (2011).

Sharma et al., Mass Transfer and Solubility of CO and H2 in Ionic Liquid. Case of [Bmim][PF6] with Gas-Inducing Stirrer Reactor, Ind. Eng. Chem. Res., 48:4075-4082 (2009).

Smith et al., A comparison of fluoroalkyl derivatized imidazolium:TFSI and alkyl-derivatized imidazolium:TFSI ionic liquids: a molecular dynamics simulation study, Phys. Chem. Chem. Phys., 12(26):7064-7076 (2010).

Smith et al., A comparison of ether and alkyl derivatized imidazolium based room temperature ionic liquids: a molecular dynamics simulation study, Phys. Chemistry Chemical Phys., 10(4):6301-6312 (2008).

Strazisar et al., Degradation Pathways for Monoethanolamine in a CO2 Capture Facility, Energy Fuels, 17:1034-1039 (2003).

Tokuda et al., Physicochemical Properties and Structures of Room Temperature Ionic Liquids. 2. Variation of Alkyl Chain Length in Imidazolium Cation, J. Phys. Chem. B, 109:6103-6110 (2005).

Tokuda et al., How Ionic Are Room-Temperature Ionic Liquids? An Indicator of the Physicochemical Properties, J. Phys. Chem. B, 110:19593-19600 (2006).

Verevkin et al., Thermodynamics of Ionic Liquids Precursors: 1-Methylimidazole, J. Phys. Chem. B, 115 (15):4404-4411 (2011).

Wang et al., Carbon dioxide capture by superbase-derived ionic liquids, Angew. Chem. Int. Ed, 49(43):5978-5981 (2010).

Wasserscheid et al., 1-n-butyl-3-methylimidazolium ([bmim]) octylsulfate: An Even Greener Ionic Liquid, Green Chem., 4:400-404 (2002).

Widegren et al., Density, Viscosity, Speed of Sound, and Electrolytic Conductivity for the Ionic Liquid 1-Hexyl-3-methylimidazolium Bis(trifluoromethylsulfonyl)imide and Its Mixtures with Water, J. Chem. Eng. Data, 52:2331-2338 (2007).

Wolfenden et al., Monoalkyl sulfates as alkylating agents in water, alkylsulfatase rate enhancements, and the "energy-rich" nature of sulfate half-esters, Proc. Nat. Acad. Sci., 104:83-86 (2007).

Zhou et al., Densities and Viscosities of 1-Butyl-3-methylimidazolium Tetrafluoroborate + H2O Binary Mixtures from (303.15 to 353.15) K, J. Chem. Eng. Data, 51:905-908 (2006).

Ahosseini et al., Viscosity of Imidazolium-Based Ionic Liquids at Elevated Pressures: Cation and Anion Effects, Int. J. Thermophys., 29:1222-1243 (2008).

Anthony et al., Anion Effects on Gas Solubility in Ionic Liquids, J. Phys. Chem. B, 109:6366-6374 (2005).

Armand et al., Ionic-liquid materials for the electrochemical challenges of the future, Nat. Mater., 8:621-629 (2009).

Bara et al., Versatile and Scalable Method for Producing N-Functionalized Imidazoles, Ind. Eng. Chem. Res., 50 (24):13614-13619 (2011).

Bara et al., Room-Temperature Ionic Liquids and Composite Materials: Platform Technologies for CO2 Capture, Acc. Chem. Res., 43:152-159 (2010).

Bara et al., Guide to CO2 Separations in Imidazolium-based Room-Temperature Ionic Liquids, Ind. Eng. Chem. Res., 48(6):2739-2751 (2009).

Bara et al., Enhanced CO2 Separation Selectivity in Oligo(ethylene glycol) Functionalized Room-Temperature Ionic Liquids, Ind. Eng. Chem. Res., 46:5380-5386 (2007).

Bara et al., Gas Separations in Fluoroalkyl-functionalized Room-Temperature Ionic Liquids Using Supported Liquid Membranes, Chem. Eng. J., 147:43-50 (2009).

Bates et al., CO2 Capture by a Task-Specific Ionic Liquid, J. Am. Chem. Soc., 124:926-927 (2002).

Cadena et al., Why is CO2 so Soluble in Imidazolium-Based Ionic Liquids?, J. Am. Chem. Soc., 126:5300-5308 (2004).

Camper et al., Room-Temperature Ionic Liquid—Amine Solutions: Tunable Solvents for Efficient and Reversible Capture of CO2, Ind. Eng. Chem. Res., 47(21):8496-8498 (2008).

Carlisle et al., Interpretation of CO2 Solubility and Selectivity in Nitrile-functionalized Room-Temperature Ionic Liquids Using a Group Contribution Approach, Ind. Eng. Chem. Res., 47:7005-7012 (2008).

Carvalho et al., Effect of Water on the Viscosities and Densities of 1-Butyl-3-methylimidazolium Dicyanamide and 1-Butyl-3-methylimidazolium Tricyanomethane at Atmospheric Pressure, J. Chem. Eng. Data, 55:645-652 (2010).

Crosthwaite et al., Phase Transition and Decomposition Temperatures, Heat Capacities and Viscosities of Pyridinium Ionic Liquids, J. Chem. Thermodyn., 37:559-568 (2005).

Domanska et al., Temperature and Composition Dependence of the Density and Viscosity of Binary Mixtures of {1-Butyl-3-methylimidazolium Thiocyanate + 1-Alcohols}, J. Chem. Eng. Data, 54:2113-2119 (2009).

Emel'yanenko et al., Building Blocks for ionic liquids: Vapor pressures and vaporization enthalpies of 1-(n-alkyl)-imidazoles, J. Chem. Thermodyn., 43(10):1500-1505 (2011).

Finotello et al., Room-temperature ionic liquids: Temperature dependence of gas solubility selectivity, Ind. Eng. Chem. Res., 47(10):3453-3459 (2008).

Finotello et al., Ideal gas solubilities and solubility selectivities in a binary mixture of room temperature ionic liquids, J. Phys. Chem. B, 112(8):2335-2339 (2008).

Fletcher et al., Physical Properties of Selected Ionic Liquids for Use as Electrolytes and Other Industrial Applications., J. Chem. Eng. Data, 55:778-782 (2010).

Gardas et al., A group contribution method for viscosity estimation of ionic liquids, Fluid Phase Equilibr., 266:195-201 (2008).

Ge et al., Densities and Viscosities of 1-Butyl-3-methylimidazolium Trifluoromethanesulfonate + H2O Binary Mixtures at T = (303.15 to 343.15) K, J. Chem. Eng. Data, 53:2408-2411 (2008).

Gomez et al., Physical Properties of Pure 1-Ethyl-3-methylimidazolium Ethylsulfate and Its Binary Mixtures with Ethanol and Water at Several Temperatures, J. Chem. Eng. Data, 51:2096-2102 (2006).

Gutowski et al., Amine-functionalized Task-Specific Ionic Liquids: A Mechanistic Explanation for the Dramatic Increase in Viscosity upon Complexation with CO2 from Molecular Simulation, J. Am. Chem. Soc., 130:14690-14704 (2008).

Han et al., Ionic Liquids in Separations, Acc. Chem. Res., 40:1079-1086 (2007).

Harper et. al., Survey of Carbon Dioxide Capture in Phosphonium-Based Ionic Liquids and End-Capped Polyethylene Glycol Using DETA (DETA = Diethylenetriamine) as a Model Absorbent, Ind. Eng. Chem. Res., 50:2822-2830 (2011).

Harris et al., Temperature and Pressure Dependence of the Viscosity of the Ionic Liquid 1-Butyl-3-methylimidazolium Tetrafluoroborate: Viscosity and Density Relationships in Ionic Liquids, J. Chem. Eng. Data, 52: 2425-2430 (2007).

Hasib-Ur-Rahman et al., CO2 capture in alkanolamine/room-temperature ionic liquid emulsions: A viable approach with carbamate crystallization and curbed corrosion behavior, Int. J. Greenh. Gas Control, 6:246-252 (2012).

Huang et. al., Chloride ion enhanced thermal stability of carbon dioxide captured by monoethanolamine in hydroxyl imidazolium based ionic liquids, Energy Environ. Sci., 4:2125-2133 (2011).

Jacquemin et al., Thermophysical Properties, Low Pressure Solubilities and Thermodynamics of Solvation of Carbon Dioxide and Hydrogen in Two Ionic Liquids Based on the Alkylsulfate Anion, Green Chem., 10:944-950 (2008).

Jacquemin et al., Density and Viscosity of Several Pure and Watersaturated Ionic Liquids. Green Chem., 8:172-180 (2006).

Karadas et al., Review on the Use of Ionic Liquids (ILs) as Alternative Fluids for CO2 Capture and Natural Gas Sweetening, Energ. Fuels, 24:5817-5828 (2010).

Kim et al., Significantly Enhanced Reactivities of the Nucleophilic Substitution Reactions in Ionic Liquid, J. Org. Chem., 68:4281-4285 (2003).

LaFrate et al., Accelerated Aging and Degradation Analysis of CO2 Capture Solvents Containing Ionic Liquids, DOE degradation paper, Energy & Fuels, p. 1-12 (Apr. 30, 2012).

LaFrate et al., High Water Vapor Flux Membranes Based on Novel Diol-Imidazolium Polymers, Ind. Eng. Chem. Res., 49:11914-11919 (2010).

Lepaumier et al., Degradation of MMEA at absorber and stripper conditions, Chem. Eng. Sci., 66:3491-3498 (2011).

Lin et al., Materials selection guidelines for membranes that remove CO2 from gas mixtures, J. Mol. Struct., 739:57-74 (2005).

Mokhtarani et al., Density and Viscosity of 1-butyl-3-methylimidazolium Nitrate with Ethanol, 1-propanol, or 1-butanol at Several Temperatures, J. Chem. Thermodyn., 41:1432-1438 (2009).

Mokhtarani et al., Densities, Refractive Indices, and Viscosities of the Ionic Liquids 1-Methyl-3-octylimidazolium Tetrafluoroborate and 1-Methyl-3-butylimidazolium Perchlorate and Their Binary Mixtures with Ethanol at Several Temperatures, J. Chem. Eng. Data, 53:677-682 (2008).

Muhammad et al., Thermophysical Properties of 1-hexyl-3-methyl Imidazolium Based Ionic Liquids with Tetrafluoroborate, Hexafluorophosphate and bis(trifluoromethylsulfonyl)imide Anions, J. Chem. Thermodyn., 40:1433-1438 (2008).

NETL, Carbon Sequestration Technology Roadmap and Program Plan (2007).

NETL, Existing Plants, Emissions and Capture—Setting CO2 Program Goals, DOE/NETL-2009/1366, Res. & Dev. Goals for CO2 Capture Tech. (2011).

Pereiro et al., Physical Properties of 1-Butyl-3-methylimidazolium Methyl Sulfate as a Function of Temperature, Chem. Eng. Data, 52:377-380 (2007).

Pereiro et al., Physical Properties of Ionic Liquids Based on 1-alkyl-3-methylimidazolium Cation and Hexafluorophosphate as Anion and Temperature Dependence, J. Chem. Thermodyn., 39:1168-1175 (2007).

Rochelle, Amine Scrubbing for CO2 Capture, Science, 325:1652-1654 (2009).

Rodriguez et al., Temperature and Composition Dependence of the Density and Viscosity of Binary Mixtures of Water + Ionic Liquid, J. Chem. Eng. Data, 51:2145-2155 (2006).

Sanchez et al., Density, Viscosity, and Surface Tension of Synthesis Grade Imidazolium, Pyridinium, and Pyrrolidinium Based Room Temperature Ionic Liquids, Chem. Eng. Data, 54:2803-2812 (2009).

Sanmamed et al., Viscosity-induced errors in the density determination of room temperature ionic liquids using vibrating tube densitometry, Fluid Phase Equilibr., 252:96-102 (2007).

Schreiner et al., Fractional Walden Rule for Ionic Liquids: Examples from Recent Measurements and a Critique of the So-Called Ideal KCl Line for the Walden Plot, J. Chem. Eng. Data, 55:1784-1788 (2010).

Seddon et al., Viscosity and Density of 1-Alkyl-3-methylimidazolium Ionic Liquids, ACS Symp. Ser., 819:34-49 (2002).

Shannon et al., Evaulation of Alkylimidazoles as Physical Solvents for CO2/CH4 Separation, Ind. Eng. Chem Res., 51:515-522 (2012).

International Search Report and Written Opinion for Application No. PCT/US2012/030672 dated Sep. 12, 2012.

\* cited by examiner

N-FUNCTIONALIZED IMIDAZOLE-CONTAINING SYSTEMS AND METHODS OF USE

CROSS-REFERENCE TO PRIORITY APPLICATION

This application claims the benefit of priority to U.S. Provisional Application No. 61/468,314, filed Mar. 28, 2011, which is incorporated herein by reference in its entirety.

FIELD

The subject matter disclosed herein generally relates to systems containing imidazoles or imidazole-amine blends and methods of their preparation. Also, the subject matter described herein generally relates to methods of using the systems described herein to capture and reduce volatile compounds from gas streams and liquid streams.

BACKGROUND

There is a worldwide interest in capturing and sequestering or reusing carbon dioxide ($CO_2$) emissions to stabilize the climate. Aqueous amine processes, widely used throughout the natural gas industry to reduce $CO_2$ from gas streams via chemical reaction, represent the benchmark by which $CO_2$ capture technologies are evaluated (NETL, *Carbon Sequestration Technology Roadmap and Program Plan* (2007); Rochelle, G. T., "Amine Scrubbing for $CO_2$ Capture," *Science*, 325:1652-1654 (2009)). While effective at reducing $CO_2$ from gas streams, amine processes are highly energy intensive, with much of the energy penalty attributed to boiling water during amine regeneration. Thus, aqueous amine processes will inherently suffer from large energy penalties. However, new solvents with little or no volatility can provide the desired energy efficiency.

Ionic liquids have received significant attention as solvents for $CO_2$ capture (Bara, J. E., et al., "Guide to $CO_2$ Separations in Imidazolium-based Room-Temperature Ionic Liquids," *Ind. Eng. Chem. Res.*, 48:2739-2751 (2009)). As ionic liquids do not evaporate, they potentially offer greatly improved energy efficiency. However, the use of ionic liquids for $CO_2$ capture has not been scaled due to limitations of their physical and thermodynamic properties. Issues with ionic liquids consistently cited are very low $CO_2$ loading, high viscosity, and exceedingly high costs (NETL, *Existing Plants, Emissions and Capture—Setting $CO_2$ Program Goals*, DOE/NETL-2009/1366). Inclusion of amine functionalities within the ionic liquid (i.e., "task-specific" ionic liquids) or blending ionic liquids with commodity amines such as monoethanolamine (MEA) greatly improves the $CO_2$ capacity of the solvent and also reduces the energy requirement (NETL, *Existing Plants, Emissions and Capture—Setting $CO_2$ Program Goals*, DOE/NETL-2009/1366; Camper, D. et al., "Room-Temperature Ionic Liquid—Amine Solutions: Tunable Solvents for Efficient and Reversible Capture of $CO_2$," *Ind. Eng. Chem. Res.*, 47:8496-8498 (2008)). While using ionic liquid-amine blends is promising, alternative volatile solvents that overcome the viscosity and cost limitations of ionic liquids are needed.

SUMMARY

In accordance with the purposes of the disclosed materials, compounds, compositions, and methods, as embodied and broadly described herein, the disclosed subject matter, in one aspect, relates to compounds and compositions and methods for preparing and using such compounds and compositions. In a further aspect, the disclosed subject matter relates to systems that can be used for the capture of volatile compounds in industrial and commercial natural gas production and power generation industries. More specifically, systems for the reduction of volatile compounds are described herein. The system comprises an N-functionalized imidazole and can optionally include an amine. The N-functionalized imidazole for use in the disclosed system is non-ionic under neutral conditions (e.g., under conditions where an acidic proton is not available). In other examples, the N-functionalized imidazole is not functionalized on both nitrogen atoms.

Further provided herein are methods for reducing $CO_2$, $SO_2$, or $H_2S$ from a stream (e.g., a gas stream or a liquid stream). The methods include contacting the stream with an effective amount of a system comprising an N-functionalized imidazole and, optionally, an amine, wherein the N-functionalized imidazole is non-ionic under neutral conditions.

Methods for sweetening a natural gas feed stream are also provided herein. The methods comprise contacting the natural gas feed stream with an effective amount of a system as described herein to form a purified natural gas feed stream and a gas rich system and separating the purified natural gas feed stream from the gas-rich system. The methods can further comprise regenerating the system by, for example, heating or pressurizing the gas rich system.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DESCRIPTION OF FIGURES

The accompanying Figures, which are incorporated in and constitute a part of this specification, illustrate several aspects of the invention and together with the description serve to explain the principles of the invention.

DETAILED DESCRIPTION

Figure 1:
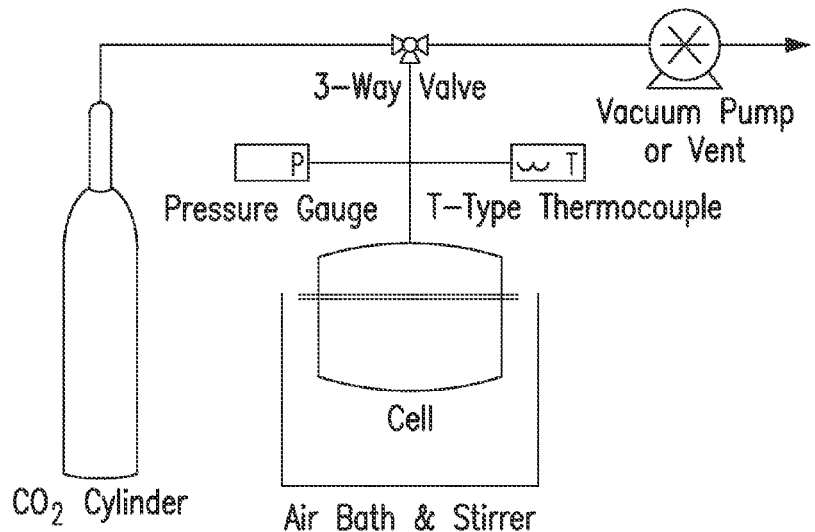
FIG. 1 is a schematic of the gas solubility apparatus.

The materials, compounds, compositions, articles, and methods described herein may be understood more readily by reference to the following detailed description of specific aspects of the disclosed subject matter and the Examples included therein.

Before the present materials, compounds, compositions, kits, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

A. General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

By "reduce" or other forms of the word, such as "reducing" or "reduction," is meant lowering of an event or characteristic (e.g., volatile compounds in a stream). It is understood that this is typically in relation to some standard or expected value, in other words it is relative, but that it is not always necessary for the standard or relative value to be referred to. For example, "reduces $CO_2$" means reducing the amount of $CO_2$ in a stream relative to a standard or a control. As used herein, reduce can include complete removal. In the disclosed method, reduction can refer to a 10%, 20%, 30%, 40%, 50%, 60%, 70%, 80%, 90%, or 100% decrease as compared to the standard or a control. It is understood that the terms "sequester," "capture," "remove," and "separation" are used synonymously with the term "reduce."

By "treat" or other forms of the word, such as "treated" or "treatment," is meant to add or mix two or more compounds, compositions, or materials under appropriate conditions to produce a desired product or effect (e.g., to reduce or eliminate a particular characteristic or event such as $CO_2$ reduction). The terms "contact" and "react" are used synonymously with the term "treat."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

B. Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)).

The term "anion" is a type of ion and is included within the meaning of the term "ion." An "anion" is any molecule, portion of a molecule (e.g., Zwitterion), cluster of molecules, molecular complex, moiety, or atom that contains a net negative charge.

The term "cation" is a type of ion and is included within the meaning of the term "ion." A "cation" is any molecule, portion of a molecule (e.g., Zwitterion), cluster of molecules, molecular complex, moiety, or atom that contains a net positive charge.

The term "non-ionic" as used herein refers to being free of ionic groups or groups that are readily substantially ionized in water. A "non-ionic" compound does not contain a charge at neutral pH (e.g., at a pH from 6.7 to 7.3). However, non-ionic compounds can be made to have a charge under acidic or basic conditions or by methods known in the art, e.g., protonation, deprotonation, oxidation, reduction, alkylation, acetylation, esterification, deesterification, hydrolysis, etc. Thus, the disclosed "non-ionic" compounds can become ionic under conditions where, for example, an acidic proton is available to protonate the compound.

The term "volatile compound" as used herein refers to chemical compounds that are capable of vaporizing to a significant amount or that exist as a gas at ambient conditions. The "volatile compounds" described herein are found in the streams and have higher vapor pressures than the stream, such as natural gas feeds. Examples of volatile compounds include light gases and acid gases, such as $CO_2$, $O_2$, $N_2$, $CH_4$, $H_2$, hydrocarbons, $H_2S$, $SO_2$, $NO$, $NO_2$, $COS$, $CS_2$, and the like.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent (s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as $-OA^1$ where $A^1$ is alkyl as defined above.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl and heteroaryl groups can be substituted or unsubstituted. The aryl and heteroaryl groups can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C=O.

The term "amino" as used herein is represented by the formula —$NA^1A^2$, where $A^1$ and $A^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "nitro" as used herein is represented by the formula —$NO_2$.

The term "silyl" as used herein is represented by the formula —Si$A^1A^2A^3$, where $A^1$, $A^2$, and $A^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "thiol" as used herein is represented by the formula —SH.

The term "thio" as used herein is represented by the formula —S—.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

It is to be understood that the compounds provided herein can contain chiral centers. Such chiral centers can be of either the (R-) or (S-) configuration. The compounds provided herein can either be enantiomerically pure, or be diastereomeric or enantiomeric mixtures.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound can, however, be a mixture of stereoisomers.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Reference will now be made in detail to specific aspects of the disclosed materials, compounds, compositions, articles, and methods, examples of which are illustrated in the accompanying Examples.

C. Materials and Compositions

N-Functionalized Imidazoles

Systems comprising N-functionalized imidazoles are provided herein. These compounds are useful for reducing volatile compounds, such as carbon dioxide ($CO_2$), carbon monoxide (CO), sulfur dioxide ($SO_2$), hydrogen sulfide ($H_2S$), nitrogen oxide (NO), nitrogen dioxide ($NO_2$), carbonyl sulfide (COS), and carbon disulfide ($CS_2$), mercaptans, $H_2O$, $O_2$, $H_2$, $N_2$, $C_1$-$C_8$ hydrocarbons (e.g., methane and propane), volatile organic compounds, and mixtures of these and other volatile compounds from gas streams and liquid streams. The N-functionalized imidazoles are non-ionic compounds under neutral compounds (i.e., the imidazoles do not contain a charge under neutral conditions). Neutral conditions include conditions where no proton is available to react with the N-functionalized imidazole (i.e., to protonate the N-functionalized imidazole). Protons can be present, but the conditions of the system, including the basicity of the N-functionized imidazole, are such that no significant amount of protonation of the N-functionalized imidazole occurs, i.e., the conditions do not produce imidazolium ion. Neutral conditions for the N-functionalized imidazoles include conditions where the pH of the system is from about 6.7 to about 7.3. In some examples, the pH of the system can be about 6.7, about 6.8, about 6.9, about 7.0, about 7.1, about 7.2, about 7.3, or the like, where any of the stated values can form an upper or lower endpoint of a range. The term "neutral conditions" is used herein relative to the specific imidazole, thus this term means conditions wherein the imidazole is not protonated (i.e., made cationic). For example, the pH of the system can be from about 6.8 to about 7.2, or from about 6.9 to about 7.1. Further, the N-functionalized imidazoles described herein are not components of an ionic-liquid (i.e., liquids that contain ions under all conditions).

The N-functionalized imidazoles described herein are represented by Formula I:

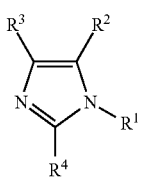

(I)

and derivatives thereof.

In Formula I, $R^1$ is substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, or cyano.

Also in Formula I, $R^2$, $R^3$, and $R^4$ are each independently selected from hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, cyano, or nitro.

Further in Formula I, adjacent R groups, i.e., $R^1$ and $R^2$, $R^1$ and $R^4$, and $R^2$ and $R^3$, can be combined to form a substituted or unsubstituted aryl, substituted or unsubstituted heteroaryl, substituted or unsubstituted cycloalkyl, substituted or unsubstituted cycloalkenyl, substituted or unsubstituted cycloalkynyl, substituted or unsubstituted heterocycloalkyl, substituted or unsubstituted heterocycloalkenyl, or substituted or unsubstituted heterocycloalkynyl. $R^2$, $R^3$, $R^4$, and $R^5$ can each also be halides, cyano, nitro, and other similar groups.

In some embodiments, the N-functionalized imidazoles represented by Formula I can be selected from an N-alkyl imidazole, an N-alkenyl imidazole, an N-alkynyl imidazole, an N-aryl imidazole, or mixtures thereof. In some examples of Formula I, $R^1$ can be unsubstituted alkyl as represented by Formula I-A. In other examples of Formula I, $R^1$ can be a heteroalkyl group such as an ethoxylated group as represented by Formula I-B. In still further examples of Formula I, $R^1$ can be a substituted alkyl group, such as, for example, cyanoalkyl or hydroxyalkyl as represented by Formula I-C and Formula I-D, respectively.

Formula I-A

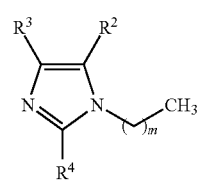

Formula I-B

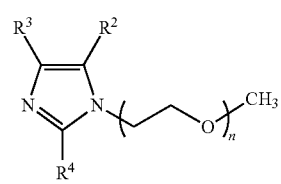

Formula I-C

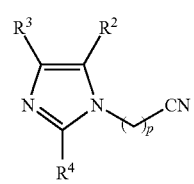

Formula I-D

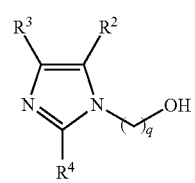

In Formula I-A, m is an integer from 0 to 20. In Formulas I-B, I-C, and I-D, n, p, and q, respectively, are independently integers from 1 to 20. In some embodiments, $R^2$, $R^3$, and $R^4$ are each hydrogen.

In some examples of Formula I, $R^1$ can be an alkyl, alkenyl, alkynyl, heteroalkyl, heteroalkenyl, heteroalkynyl, cycloalkyl, heterocycloalkyl, aryl, heteroaryl, thio, amino, alkoxyl, aryloxyl, or silyl substituted with an imidazole group to form a bis-N-substituted imidazole. For example, Formula I can be represented by Formula I-E as shown below.

Formula I-E

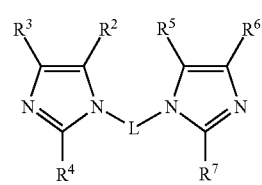

In Formula I-E, L is selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, or silyl.

Also in Formula I-E, $R^5$, $R^6$, and $R^7$ are each independently selected from hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, or cyano.

In some examples of Formula I-E, the imidazole is an imidazole dimer. In other words, in some examples of Formula I-E, $R^2$ and $R^5$ are the same substituent, $R^3$ and $R^6$ are the same substituent, and $R^4$ and $R^7$ are the same substituent.

Particular examples of Formula I include the following compounds:

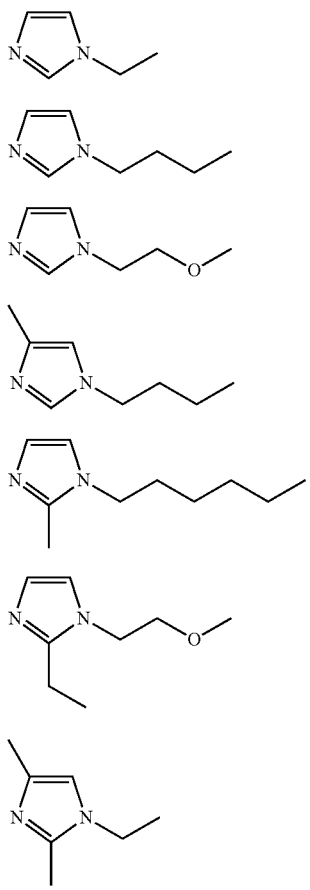

Compound I-1
Compound I-2
Compound I-3
Compound I-4
Compound I-5
Compound I-6
Compound I-7

Amines

In some embodiments, the N-functionalized imidazole containing systems can further comprise one or more amine compounds. The amine can be a primary amine, a secondary amine, a tertiary amine, a cyclic amine, or a mixture thereof. The amine compounds described herein can be represented by Formula II:

(II)

In Formula II, $R^1$, $R^2$, and $R^3$ can each independently be selected from the group consisting of hydrogen, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, or cyano.

In some embodiments, the amine can be a primary amine. According to these examples, two of $R^1$, $R^2$, or $R^3$ are hydrogen and the remaining group is other than hydrogen to form a compound according to Formula II-A.

Formula II-A

In Formula II-A, $R^1$ is selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. Particular examples of primary amines as described herein include monoethanolamine (MEA), diglycolamine (DGA), 2-amino-2-methylpropanol (AMP), and 1-(3-aminopropyl)-imidazole (API).

In some embodiments, the amine can be a secondary amine where one of $R^1$, $R^2$, or $R^3$ is hydrogen and the remaining two groups are other than hydrogen. Secondary amines as described herein can be represented by Formula II-B.

Formula II-B

In Formula II-B, $R^1$ and $R^2$ are each independently selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. Particular examples of secondary amines as described herein include N-methylethanolamine (NMEA), diethanolamine (DEA), and diisopropanolamine (DIPA).

In further embodiments, the amine can be a tertiary amine where each of $R^1$, $R^2$, and $R^3$ are other than hydrogen as represented by Formula II-C.

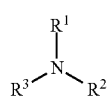

Formula II-C

In Formula II-C, $R^1$, $R^2$, and $R^3$ are each independently selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. A particular example of a tertiary amine includes N-methyldiethanolamine (MDEA).

The amines for use in the systems described herein can also include cyclic amines. According to these examples, two of $R^1$, $R^2$, or $R^3$ can combine to form a substituted or unsubstituted aryl, substituted or unsubstituted heteroaryl, substituted or unsubstituted cycloalkyl, substituted or unsubstituted cycloalkenyl, substituted or unsubstituted cycloalkynyl, substituted or unsubstituted heterocycloalkyl, substituted or unsubstituted heterocycloalkenyl, or substituted or unsubstituted heterocycloalkynyl. The cyclic amines can be represented by Formula II-D.

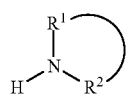

Formula II-D

In Formula II-D, the line connecting $R^1$ and $R^2$ represents a connection (e.g., a single bond or double bond) between $R^1$ and $R^2$ that forms a cyclic structure including R', N, and $R^2$. Examples of suitable cyclic amines for use in the systems described herein include a substituted or unsubstituted piperazine (PZ) and an unsubstituted imidazole.

The amine described herein can contain one amino functional group (i.e., can be a monoamine) or can contain two amino functional groups (i.e., can be a diamine), or can contain more than two amino functional groups (i.e., can be a polyamine).

Systems

The systems disclosed herein can contain one or more N-functionalized imidazoles and optionally, one or more amines. The systems described herein are not ionic liquids. For example, the combination of one or more N-functionalized imidazoles and one or more amines does not result in a low melting salt. Upon addition of an acid gas (e.g., $CO_2$, $H_2S$, etc.) the system can contain charge. Further, the systems described herein can be distilled whereas ionic liquids do not have this capability. The systems disclosed herein can be neat (i.e., can be composed of the N-functionalized imidazole and/or amine without any additional solvent) or can be dissolved or dispersed in one or more additional solvents. In some embodiments, the system is a neat system comprised primarily of one or more N-functionalized imidazoles. Systems comprised primarily of the N-functionalized imidazole can contain about 3% or less of impurities (i.e., the system contains about 97% or higher, about 98% or higher, or about 99% or higher N-functionalized imidazole based on the weight of the system).

In some embodiments, the system is a neat system composed of a mixture of one or more N-functionalized imidazoles as described herein and one or more amines as described herein (i.e., an imidazole-amine blend). The addition to one or more amines to one or more N-functionalized imidazoles results in a system with low volatility, low viscosity, and high $CO_2$ capacity. The properties of the system can be altered by changing the ratios of N-functionalized imidazole and amine present in the system.

The N-functionalized imidazole can comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the system, where any of the stated values can form an upper or lower endpoint of a range. In further examples, the N-functionalized imidazole can comprise from 1% to 99%, 10% to 90%, 20% to 80%, 30% to 70%, 40% to 60%, or 50% of the system. For example, the N-functionalized imidazole can comprise 67% of the system.

Likewise, the amine can comprise 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the system, where any of the stated values can form an upper or lower endpoint of a range. In further examples, the amine can comprise from 1% to 99%, 10% to 90%, 20% to 80%, 30% to 70%, 40% to 60%, or 50% of the system. For example, the amine can comprise 33% of the system.

In some embodiments, the system can have an N-functionalized imidazole to amine ratio of 9:1, 8:1, 7:1, 6:1, 5:1, 4:1, 3:1, 2:1, 1:1, and the like. In other embodiments, the system can have an amine to N-functionalized imidazole ratio of 9:1, 8:1, 7:1, 6:1, 5:1, 4:1, 3:1, 2:1, 1:1, and the like.

As described above, the systems described herein can be dissolved or dispersed in one or more additional solvents. For example, the one or more N-functionalized imidazole or the one or more N-functionalized imidazole and one or more amine blend can be mixed with a solvent such as water, tetrahydrofuran (THF), dichloromethane, acetonitrile, toluene, dimethyl sulfoxide (DMSO), pyridine, dimethylformamide, dioxane, glycol solvents, methanol, ethanol, propanol, butanol, ethyl acetate, methyl ethyl ketone, acetone, and the like to provide a system. In these examples, the N-functionalized imidazole or the N-functionalized imidazole and amine blend can comprise from about 0.1% to about 99.9% of the system. For example, the N-functionalized imidazoles or the N-functionalized imidazole and amine blend can comprise from about 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the system, where any of the stated values can form an upper or lower endpoint of a range. In further examples, the N-functionalized imidazole or the N-functionalized imidazole and amine blend can comprise from 1% to 99%, 10% to 90%, 20% to 80%, 30% to 70%, 40% to 60%, or 50% of the system.

The systems described herein are substantially free from volatile organic compounds. By substantially free is meant that volatile organic compounds are present at less than about 3%, 2%, 1%, 0.9%, 0.8%, 0.7%, 0.6%, 0.5%, 0.4%, 0.3%, 0.2%, 0.1%, 0.001%, 0.0001%, or the like of volatile organic compounds. Further, these systems are characterized by low viscosity in comparison with imidazolium-based ionic liquids. For example, the systems described herein are at least 10 times, 9 times, 8 times, 7 times, 6 times, 5 times, 4 times, 3 times, or 2 times less viscous than imidazolium-based ionic liquids. The intrinsic viscosity of the systems described herein can be measured, for example, according to the method described in ASTM D5225-09 using a differential viscometer. For example, the intrinsic viscosity of the systems can be measured using a Brookfield DV-II+ Pro Viscometer equipped with a ULA (low viscosity) spindle (Brookfield Engineering Laboratories, Inc.; Middleboro, Mass.). Further, the intrinsic viscosities of the systems can be measured neat (i.e., with no additional solvent added). In some embodiments, the viscosities of the systems at 24° C. can be less than 20 cP, less than 19 cP, less than 18 cP, less than 17 cP, less than 16 cP, less than 15 cP, less than 14 cP, less than 13 cP, less than 12 cP, less than 11 cP, less than 10 cP, less than 9 cP, less than 8 cP, less than 7 cP, less than 6 cP, less than 5 cP, less than 4 cP, less than 3 cP, less than 2 cP, less than 1 cP, less than 0.9 cP, less than 0.8 cP, less than 0.7 cP, less than 0.6 cP, less than 0.5 cP, less than 0.4 cP, less than 0.3 cP, less than 0.2 cP, less than 0.1 cP, or the like, where any of the stated values can form an upper or lower endpoint of a range. In further embodiments, the N-functionalized imidazoles can have a viscosity from about 0.1 cP to about 20 cP, about 0.2 cP to about 19 cP, about 0.3 cP to about 18 cP, about 0.4 cP to about 17 cP, about 0.5 cP to about 16 cP, about 0.6 cP to about 15 cP, about 0.7 cP to about 14 cP, about 0.8 cP to about 13 cP, about 0.9 cP to about 12 cP, about 1 cP to about 11 cP, about 2 cP to about 10 cP, about 3 cP to about 9 cP, about 4 cP to about 8 cP, or about 5 cP to about 7 cP. For example, at 24° C., a system comprised of 1-ethylimidazole has a viscosity of about 2.02 cP. In another example, a system comprised of 1-butylimidazole has a viscosity of about 3.38 cP at 24° C. In a further example, a system comprised of 1-hexylimidazole has a viscosity of about 2.99 cP at 45° C. Still further, a system comprised of 1-octylimidazole has a viscosity of about 7.77 cP at 25° C.

The N-functionalized imidazoles according to Formula I and the amines according to Formula II can be prepared in a variety of ways known to one skilled in the art of organic synthesis or variations thereon as appreciated by those skilled in the art. The compounds described herein can be prepared from readily available starting materials. Optimum reaction conditions can vary with the particular reactants or solvents used, but such conditions can be determined by one skilled in the art. The use of protection and deprotection, and the selection of appropriate protecting groups can be determined by one skilled in the art. The chemistry of protecting groups can be found, for example, in Wuts and Greene, Protective Groups in Organic Synthesis, 4th Ed., Wiley & Sons, 2006, which is incorporated herein by reference in its entirety.

Variations on Formula I and Formula II include the addition, subtraction, or movement of the various constituents as described for each compound. Similarly, when one or more chiral centers are present in a molecule, the chirality of the molecule can be changed. Additionally, compound synthesis can involve the protection and deprotection of various chemical groups.

The N-functionalized imidazoles and amines or the starting materials and reagents used in preparing the disclosed compounds are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), Pfizer (New York, N.Y.), GlaxoSmithKline (Raleigh, N.C.), Merck (Whitehouse Station, N.J.), Johnson & Johnson (New Brunswick, N.J.), Aventis (Bridgewater, N.J.), AstraZeneca (Wilmington, Del.), Novartis (Basel, Switzerland), Wyeth (Madison, N.J.), Bristol-Myers-Squibb (New York, N.Y.), Roche (Basel, Switzerland), Lilly (Indianapolis, Ind.), Abbott (Abbott Park, Ill.), Schering Plough (Kenilworth, N.J.), or Boehringer Ingelheim (Ingelheim, Germany), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Reactions to produce the compounds described herein can be carried out in solvents, which can be selected by one of skill in the art of organic synthesis. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (e.g., $^1$H or $^{13}$C) infrared spectroscopy, spectrophotometry (e.g., UV-visible), or mass spectrometry, or by chromatography such as high performance liquid chromatography (HPLC) or thin layer chromatography.

As shown in Scheme 1, the N-substituted imidazoles described by Formula I can be made, for example, by treating commercially available imidazole (1) with a strong base (e.g., sodium hydride or sodium hydroxide) to form the imidazolate sodium salt (2). The imidazolate sodium salt (2) can then be treated with an alkyl halide to form the N-alkylated imidazole (3). Similarly, other organohalides can be used in place of the alkyl halide to provide the corresponding N-organosubstituted imidazoles.

Scheme 1:

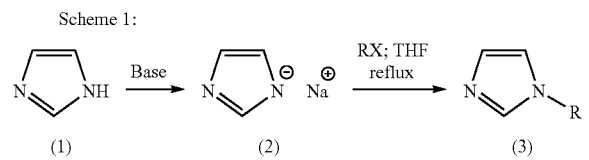

In addition, the bis-N-substituted imidazoles described by Formula I-E can be made, for example, by treating two equivalents of imidazolium sodium salt (2) with an alkyl dihalide to form compound (4) (see Scheme 2).

Scheme 2:

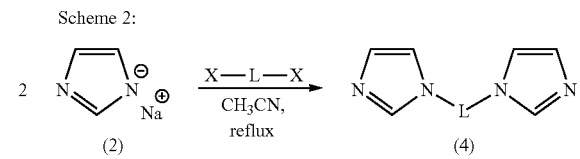

Further, the N-substituted imidazoles according to Formula I can be synthesized according to methods described in U.S. Published Patent Application Number 2009/0171098, which is incorporated by reference herein for its teaching of methods of synthesis of N-substituted imidazoles.

The disclosed imidazole-amine blends can be prepared by methods described herein. Generally, the particular N-functionalized imidazole(s) and amine(s) used to prepare the systems are selected as described herein. Then, with the particular N-functionalized imidazole(s) and amine(s) in hand, they can be combined, resulting in a system as described herein.

Providing N-functionalized imidazoles and amines used to prepare the systems depends, in one aspect, on the desired properties of the resulting system. As described herein, the disclosed compositions can have multiple desired properties (e.g., low viscosity, low volatility, high $CO_2$ capacity, etc.), which, at least in part, come from the properties of the imidazoles and amines used to prepare the systems. Thus, to prepare the disclosed systems, one or more N-functionalized imidazoles with desired properties and one or more amines with desired properties are selected and provided. Providing a desired imidazole and amine can be done in any order, depending on the preference and aims of the practitioner. For example, a particular imidazole can be provided and then a particular amine can be provided. Alternatively, a particular amine can be provided and then a particular imidazole can be provided. Further, the imidazole and amine can be provided simultaneously. Properties desired to be adjusted based on the selection of the imidazole and the amine can include, for example, the vapor pressure, viscosity, density, heat capacity, thermal conductivity, and surface tension. For example, in high pressure applications, the systems can be comprised primarily of N-functionalized imidazoles. In low pressure applications, the systems can comprise a combination of the N-functionalized imidazoles and one or more amines. Further, the amines used in the systems can be varied based on the pressure level of the application. Primary (1°) amines, such as monoethanolamine (MEA) or diglycolamine (DGA), can be suitable for use in low pressure applications. An example of a low pressure application includes post-combustion $CO_2$ capture from power plants. Secondary (2°) amines, such as N-methylethanolamine (NMEA) or piperazine (PZ), or sterically hindered 2° amines, such as diisopropranolamine (DIPA), can be suitable for use in moderate to high pressure applications. An example of a moderate to high pressure application is the removal of $CO_2$ from natural gas.

D. Methods of Using the Systems

The systems described herein can be used to reduce volatile compounds from streams (e.g., gas streams or liquid streams) as described in U.S. Published Patent Application Number 2009/0291874, which is incorporated by reference herein for its methods and techniques of volatile compound reduction. As used herein, volatile compounds can include to undesirable gaseous components found in a source and having a molecular weight lower than 150 g/mol. For example, the volatile compounds can have a molecular weight lower than 140 g/mol, 130 g/mol, 120 g/mol, 110 g/mol, 100 g/mol, 90 g/mol, 80 g/mol, 70 g/mol, 60 g/mol, 50 g/mol, 40 g/mol, 30 g/mol, 20 g/mol, or the like, where any of the stated values can form an upper or lower endpoint of a range. Examples of volatile compounds include $CO_2$, CO, COS, $H_2S$, $SO_2$, NO, $N_2O$, mercaptans, $H_2O$, $O_2$, $H_2$, $N_2$, $C_1$-$C_8$ hydrocarbons (e.g., methane and propane), volatile organic compounds, and mixtures of these.

The method for reducing a volatile compound from a stream can include contacting the stream with an effective amount of a system as described herein. In some embodiments, the system is comprised primarily of an N-functionalized imidazole. In other embodiments, the system contains an N-functionalized imidazole and an amine. For example, volatile compounds from a gas stream (e.g., a natural gas stream or a flue gas stream) can be reduced according to this method.

Further described herein is a method for sweetening a natural gas feed stream. The method includes contacting the natural gas feed stream with an effective amount of a system as described herein to form a purified natural gas feed stream and a gas-rich system. Optionally, the natural gas feed stream can be contacted with a second system as described herein. The contacting of the natural gas feed stream with the second system can be performed simultaneously as the contacting with the first system (i.e., the gas feed stream can be contacted with both the first and second system) or can be performed sequentially (i.e., the gas feed stream can be contacted with the second system after the gas feed stream has been contacted with the first system). The purified natural gas feed stream can then be separated from the gas-rich system. In some embodiments, the volatile compounds are reduced from the gas-rich system to regenerate the system. The system can be regenerated by heating or pressurizing the gas-rich system.

The examples below are intended to further illustrate certain aspects of the methods and compositions described herein, and are not intended to limit the scope of the claims.

EXAMPLES

The following examples are set forth below to illustrate the methods and results according to the disclosed subject matter.

These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Materials 1-methylimidazole (1) was obtained from Sigma-Aldrich (Milwaukee, Wis. USA) and used without further purification. 1-n-alkylimidazoles (2-10) were synthesized from sodium imidazolate (Nam) and a corresponding alkyl bromide as described in Bara et al., "Versatile and Scalable Method for Producing N-Functionalized Imidazoles," *Ind. Eng. Chem. Res.*, 50(24); 13614-13619 (2011) and in U.S. Published Patent Application Number 2009/0171098, which are incorporated by reference herein in their entireties for their teaching of N-functionalized imidazoles and synthesis thereof. Research Grade $CO_2$ and $CH_4$ were purchased from AirGas (Radnor, Pa. USA).

Example 2

Density Measurements

Density values for each 1-n-alkylimidazole were obtained using a Mettler Toledo DM45 DeltaRange density meter, which operates via electromagnetically induced oscillation of a glass U-form tube, with automatic compensation for variations in atmospheric pressure. The density meter can measure liquid samples within the range of 0-3 $g/cm^3$ with a minimal sample size of 1.2 $cm^3$. The accuracy of the density meter measurements is ±0.00005 $g/cm^3$ for all operating temperatures. Densities of 1-n-alkylimidazoles were recorded over a temperature range of 20-80° C. at 10° C. increments, for a total of seven density measurements per compound. The unit was washed between every run with deionized $H_2O$, followed by an acetone rinse, and then dried by air flow. The density reading of the clean, empty cell was verified to be consistent with that of air at 20° C. (0.00120 $g/cm^3$) before continuing to the next sample.

The measured density values for 1-n-alkylimidazoles over the temperature range of 20-80° C. are presented in Table 1.

TABLE 1

| 1-n-alkylimidazole | Density ($g/cm^3$) Temperature (° C.) | | | | | | |
|---|---|---|---|---|---|---|---|
| | 20 | 30 | 40 | 50 | 60 | 70 | 80 |
| 1 - Methyl | 1.03525 | 1.02644 | 1.01760 | 1.00871 | 0.99979 | 0.99083 | 0.98178 |
| 2 - Ethyl | 0.99448 | 0.98581 | 0.97712 | 0.96843 | 0.95969 | 0.95089 | 0.94208 |
| 3 - Propyl | 0.97290 | 0.96456 | 0.95624 | 0.94789 | 0.93952 | 0.93111 | 0.92267 |
| 4 - Butyl | 0.95137 | 0.94338 | 0.93540 | 0.92740 | 0.91938 | 0.91132 | 0.90320 |
| 5 - Pentyl | 0.93887 | 0.93111 | 0.92334 | 0.91556 | 0.90776 | 0.89994 | 0.89208 |
| 6 - Hexyl | 0.92990 | 0.92226 | 0.91463 | 0.90698 | 0.89932 | 0.89166 | 0.88395 |
| 7 - Octyl | 0.91154 | 0.90429 | 0.89706 | 0.88983 | 0.88259 | 0.87531 | 0.86801 |
| 8 - Decyl | 0.90145 | 0.89437 | 0.88729 | 0.88022 | 0.87315 | 0.86608 | 0.85900 |
| 9 - Dodecyl | 0.89474 | 0.88776 | 0.88083 | 0.87390 | 0.86699 | 0.86008 | 0.85315 |
| 10 - Tetradecyl | 0.88940 | 0.88255 | 0.87574 | 0.86895 | 0.86218 | 0.85541 | 0.84862 |

With the exception of 1-methylimidazole in the range of 20-50° C., all of the measured densities for 1-n-alkylimidazoles were less than 1.00000 $g/cm^3$. For each compound, density was observed to decrease linearly with increasing temperature, and across the entire group of 1-n-alkylimidazoles, density decreased with increasing length of the n-alkyl substituent.

Example 3

Viscosity Measurements

Viscosity data were obtained using a Brookfield DV-II+ Pro viscometer. The viscosity measurement is based on a torque value and shear rate of a certain sized spindle in contact with a pre-determined amount of fluid. The "ULA" spindle and jacketed sample cell was used for these relatively low viscosity liquids (<25 cP), which required a minimal sample size of approximately 16 $cm^3$. The viscometer accuracy is ±1% of the reading for torque measurement with a repeatability of ±0.2% of the reading. The viscosity of each 1-n-alkylimidazole was measured at ten temperatures within the range of 20-80° C. The temperature of the jacketed sample chamber was controlled via the Brookfield TC-602P circulating bath, which has an operating range of −20-200° C. and a temperature stability of ±0.01° C. The sample cell was cleaned between every run by rinsing with deionized water and acetone, followed by air drying. The viscometer was re-zeroed between runs.

The measured viscosity values for 1-n-alkylimidazoles over the temperature range of 20-80° C. are presented in Table 2.

TABLE 2

| 1-n-alkylimidazole | Viscosity (cP) Temperature (° C.) | | | | | | | | | |
|---|---|---|---|---|---|---|---|---|---|---|
| | 20 | 25 | 30 | 35 | 40 | 45 | 50 | 60 | 70 | 80 |
| 1 - Methyl | 1.92 | 1.77 | 1.64 | 1.51 | 1.40 | 1.30 | 1.28 | 1.24 | 1.21 | 1.17 |
| 2 - Ethyl | 2.22 | 2.04 | 1.86 | 1.70 | 1.56 | 1.45 | 1.34 | 1.30 | 1.23 | 1.22 |
| 3 - Propyl | 3.17 | 2.81 | 2.50 | 2.26 | 2.05 | 1.86 | 1.69 | 1.45 | 1.25 | 1.23 |
| 4 - Butyl | 3.95 | 3.47 | 3.05 | 2.71 | 2.43 | 2.19 | 1.99 | 1.66 | 1.43 | 1.42 |
| 5 - Pentyl | 5.13 | 4.49 | 3.89 | 3.42 | 3.02 | 2.70 | 2.42 | 2.00 | 1.68 | 1.43 |
| 6 - Hexyl | 5.88 | 5.07 | 4.38 | 3.82 | 3.37 | 2.99 | 2.67 | 2.18 | 1.82 | 1.55 |
| 7 - Octyl | 9.17 | 7.77 | 6.56 | 5.63 | 4.87 | 4.25 | 3.76 | 3.00 | 2.44 | 2.04 |
| 8 - Decyl | 12.95 | 10.75 | 9.00 | 7.62 | 6.50 | 5.62 | 4.93 | 3.86 | 3.10 | 2.56 |
| 9 - Dodecyl | 18.14 | 14.97 | 12.36 | 10.34 | 8.77 | 7.52 | 6.50 | 5.00 | 3.95 | 3.21 |
| 10 - Tetradecyl | 24.69 | 20.31 | 16.60 | 13.72 | 11.47 | 9.73 | 8.35 | 6.30 | 4.92 | 3.94 |

As can be seen in Table 2, almost all of the measured viscosities for the ten 1-n-alkylimidazole compounds were <10 cP, and only 1-tetradecylimidazole exhibited a viscosity >20 cP below 30° C. For each compound, viscosity was observed to decrease in a non-linear fashion with increasing temperature. Viscosity was strongly correlated to length of the n-alkyl substituent, with an order of magnitude difference between the least viscous and most viscous compounds at 20° C., though reducing to about 3.5× difference at the highest temperature.

Example 4

$CO_2$ Solubility Measurements

The solubility of $CO_2$ in each of the 1-n-alkylimidazoles was measured using a custom built apparatus (FIG. 1) based on an approach developed for the natural gas industry (see Bara et al., *Acc. Chem. Res.* 2010, 43, 152-159).

The cell body was constructed from a 2.5" OD (6.35 cm OD) sanitary fitting butt-welded to a corresponding bottom cap. ¼" (0.635 cm) VCR and ⅛" (0.3175 cm) tube fittings were welded to the top cap, and a PTFE gasket and spring-loaded clamp were used to seal the vessel. The sanitary fittings, gaskets, and clamps were purchased from McMaster-Carr. Swagelok fittings were purchased from Alabama Fluid Systems Technologies (Pelham, Ala.). Machine work was performed by Engineering Technical Services at the University of Alabama. Welding was performed by McAbee Construction (Tuscaloosa, Ala.).

Experiments were conducted at ambient temperature (25±0.5° C.) and the temperature controlled via air circulation. Approximately 40 mL of a 1-n-alkylimidazole compound of interest was added to the cell and the weight of solvent recorded using a Mettler Toledo XS6002S Precision Balance, with a repeatability of 8 mg. The volume of solvent was calculated using the density values measured as described above. A 1.75 inch (4.445 cm) wide stir bar was added to ensure thorough contact between the gas and liquid phases. The vessel was then sealed and the residual air removed via vacuum until the system pressure was less than about 5 torr as measured by an MKS Baratron pressure transducer (accuracy of ±0.5% of the reading) and displayed on a MKS PDR2000A Two-Channel Digital Power Supply/Readout. The transducer was also interfaced with LabView (National Instruments) for digital data acquisition and visual monitoring of system temperature and pressure. The sealed apparatus was then weighed to provide a tare weight prior to adding $CO_2$, the instrumentation re-connected and then unit secured above a stir plate. $CO_2$ was added to the cell at pressures between 3-7 atm, and the equilibrium pressure and weight of added $CO_2$ were recorded. Confirmation that equilibrium had been reached was determined via a stable pressure reading (±2 torr) over 10 minutes on both the readout and from the data acquisition software. Because the solvent viscosity was low, and the vessel could be stirred, equilibrium was typically achieved in <30 min.

A $CO_2$ pressure of 3 atm was chosen as a starting point so as to ensure a sufficient mass of $CO_2$ had been added to be far outside the error of the balance. About 350-400 mg of $CO_2$ per atmosphere of $CO_2$ pressure were absorbed in 40 mL of solvent. The moles of $CO_2$ ($n_{CO2}$) added to the vessel were calculated from the mass increase and the molecular weight of $CO_2$ (44.01 g/mol). The moles of $CO_2$ in the vapor phase ($n_{CO2}^v$)($n_{CO2}^v$) were calculated by subtracting the volume of the stir bar and solvent from that of the empty cell, and applying the ideal gas law (Eqn.1).

$$P_{vapor}(V_{cell} - V_{stirbar} - V_{solvent}) = n_{CO2}^v RT_{vapor} \qquad (1)$$

The moles of $CO_2$ in the liquid phase ($n_{CO2}^l$)($n_{CO2}^v$) were taken to be the moles in the vapor phase subtracted from the total moles of $CO_2$ added to the cell (Eqn. 2).

$$n_{CO2}^l = n_{CO2} - n_{CO2}^v \qquad (2)$$

The error in repeatability using this apparatus and technique was found to be ±4%, which is in line with the error of similar equipment previously described for making similar gas solubility measurements on ILs. See, for example, Bara et al., *Acc. Chem. Res.* 2010, 43, 152-159; Armand et al., *Nat. Mater.* 2009, 8, 621-629; and McCabe et al., *Unit Operations of Chemical Engineering*, 6th Ed.; McGraw-Hill: Boston, 2001.

It was assumed that the solvent density was constant upon addition of $CO_2$ (i.e., no expansion). The solubility of $CO_2$ in each 1-n-alkylimidazole was found to be linear in the pressure range examined, and Henry's Law constants (H(atm)) were calculated from the following relationship (Eqn. 3):

$$H(\text{atm}) = \frac{P(\text{atm}) \cdot (n_{CO2}^l + n_{imid})}{n_{CO2}^l} \qquad (3)$$

Volumetric solubility (S) was calculated as standard cubic centimeters ($cm^3$(STP)) of $CO_2$ dissolved per $cm^3$ of 1-n- alkylimidazole (cm³ imid) per atmosphere of pressure, according to Eqn. 4:

$$S = \frac{n'_{CO2} \cdot 22414 \frac{cm^3(STP)}{molCO_2}}{cm^3_{imid} P(atm)} \quad (4)$$

Solubility data for $CO_2$ in 1-n-alkylimidazoles at low pressures and 25±0.5° C. in terms of Henry's constants (H(atm)) and volumetric solubility (S) are presented in Table 3.

TABLE 3

| 1-n-alkylimidazole | $H_{CO2}$ (atm) | S (cm³ (STP) cm⁻³ atm⁻¹) |
|---|---|---|
| 1—Methyl | 109 ± 2 | 2.71 ± 0.04 |
| 2—Ethyl | 97.9 ± 0.6 | 2.49 ± 0.07 |
| 3—Propyl | 88.9 ± 0.3 | 2.40 ± 0.06 |
| 4—Butyl | 77.4 ± 2.0 | 2.31 ± 0.04 |
| 5—Pentyl | 70.0 ± 1.3 | 2.25 ± 0.03 |
| 6—Hexyl | 67.8 ± 0.8 | 2.18 ± 0.09 |
| 7—Octyl | 58.3 ± 0.9 | 2.11 ± 0.04 |
| 8—Decyl | 53.6 ± 0.7 | 1.99 ± 0.06 |
| 9—Dodecyl | 51.7 ± 1.1 | 1.82 ± 0.06 |
| 10—Tetradecyl | 48.6 ± 1.7 | 1.77 ± 0.04 |

Uncertainties represent ±1 standard deviation from the mean.

Example 5

Comparison of Density & Viscosity

For 1-n-alkylimidazoles, density is influenced by the length of the n-alkyl chain and temperature. Both increasing temperature and increasing side chain length are observed to decrease density. Trends similar to 1-n-alkylimidazoles are also observed for families of [$C_n$mim][X] ILs (e.g., [$C_2$mim][$BF_4$], [$C_{1-4}$mim][$BF_4$], [$C_6$mim][$BF_4$]), however IL density is also strongly influenced by the nature of the anion, across a family with identical cations such as [$C_4$mim][$BF_4$], [$C_4$mim][$PF_6$], [$C_4$mim][OTf], etc. While densities of 1-n-alkylimidazoles were observed to only vary about 15% between the least and most dense species at a given temperature, densities of ILs can vary more widely. For example, a 30% difference is observed in the densities of [$C_4$mim][$Tf_2$N] (r=1.44 g/cm³) and [$C_4$mim][dca] (r=1.06 g/cm³) at 298 K. Even greater spreads are possible with smaller cations such as [$C_2$mim] or anions with greater fluorination such as bis(perfluoroethylsulfonyl)imide ([beti]). All [$C_n$mim][X] ILs are about 10% or more dense than their 1-n-alkylimidazole analogues at the same temperature.

The differences in densities between 1-n-alkylimidazoles and [$C_n$mim][X] ILs might influence certain process design considerations (e.g., head pressure in a vessel, increased mass flow rate), the magnitude of the difference (10-50%) is relatively small and within range of many common organic compounds. Common chlorinated organic solvents (e.g., chloroform) are nearly as dense as the most dense ILs, while brominated compounds (e.g., bromoform) can be at least twice as dense as most [$C_n$mim][X] ILs.

While the change in density associated with transitioning from a neutral 1-n-alkylimidazole to a [$C_n$mim][X] IL is relatively small, a penalty is exacted on the solvent viscosity. Viscosity increases by an order of magnitude or more when transitioning from the neutral 1-n-alkylimidazole to the [$C_n$mim][X] IL. For 1-n-alkylimidazoles, viscosity was observed to increase with increasing chain length and decreasing temperature. A similar trend holds for across a family of [$C_n$mim] ILs with the same anion, [X]. However, viscosity differences between ILs with the same [$C_n$mim] cation and different anion species can be quite large, spanning almost an order of magnitude.

Example 6

1-N-Alkylimidazoles as Co-solvents for Post-Combustion $CO_2$ Capture

In order to determine if 1-n-alkylimidazoles could be used as solvents/agents for low pressure $CO_2$ capture applications, the uptake of $CO_2$ in an mixture of 1-butylimidazole (37.37 g, 158.2 mmol) and monoethanolamine (MEA) (9.968 g, 163.2 mmol) (overall mixture about 80:20 vol/vol) was determined using the same apparatus as described in Example 4, and a slightly modified experimental procedure. Initially, a stream of $CO_2$ at about 1000 torr of $CO_2$ was fed to the cell for several minutes. The valve was then closed and the pressure in the cell was observed to decay until an equilibrium pressure of 606 torr was achieved. After obtaining the mass of the cell and applying Eqn. 1, it was found that 118 mmol (5.20 g) of $CO_2$ were absorbed by the liquid phase.

An initial attempt to determine the exact reaction mechanism(s) responsible for the excess absorption of $CO_2$ was carried out using ¹H NMR spectroscopy. ¹H NMR spectra were obtained in $d^6$-DMSO as well as with no deuterated solvent. Proton signals originally in the range of 6.0-6.5 ppm when the solvent had absorbed less than 100% of its theoretical capacity were observed to shift downfield to the range of 6.5-7.0 ppm when the solvent had absorbed more than 100% of its theoretical $CO_2$ capacity. The chemical shifts were also further downfield than were reported when $CO_2$ was captured by MEA in an [$C_6$mim][$Tf_2$N], which was limited to 0.50 mol $CO_2$/mol MEA due to precipitation of the MEA-carbamate product. For the 1-butylimidazole-MEA solvent mixture, a broad peak was observed even further downfield between 8.5-8.75 ppm, when no deuterated solvent was included in the NMR sample, which is likely indicative of H⁺ exchange between 1-butylimidazole and MEA. These data indicate that 1-butylimidazole can have a participatory role in chemical reactions to capture $CO_2$ in the presence of an amine.

The viscosity of the $CO_2$-rich solvent was measured immediately after the experiment was completed and the liquid phase rapidly transferred to the viscometer. The viscosity of the $CO_2$-rich solution was initially measured as about 100 cP at 25° C., though the value drifted lower to 85 cP over several minutes, presumably due to loss of $CO_2$ from the reaction product(s).

The results for the 1-butylimidazole-MEA mixture indicate that the mixtures of 1-n-alkylimidazoles can be used as effective solvents/agents for low pressure $CO_2$ capture that provide high $CO_2$ capacity and relatively low viscosities for the $CO_2$-rich phase, especially when compared to TSIL compounds. Carbamate-imidazolium salt products can be considered as a type of reversible IL that exists as a product formed between $CO_2$, an amine and a 1-n-alkylimidazole.

Example 7

$CO_2$ and $CH_4$ Solubility Measurements

Solubilities of $CO_2$ and $CH_4$ in 1-n-alkylimidazoles were measured as described above in Example 2. Experiments were conducted at temperatures of 30, 45, 60, and 75° C. (as controlled by an oil bath) for both $CO_2$ and $CH_4$ measurements. An initial charge of gas was fed at 30° C. until the pressure equilibrated at about 5 atm, which was selected as the target pressure. Solubility values for all temperatures were then calculated from this known mass of gas in the system and the change in pressure upon heating (see, e.g., Finotello et al., "Room-temperature ionic liquids: Temperature dependence of gas solubility selectivity," *Ind. Eng. Chem. Res.*, 47:3453-3459 (2008), which is incorporated herein for its teaching of gas solubility measurements and calculations). The vapor pressure of the 1-n-alkylimidazole compound can be assumed as negligible under the experimental temperature and pressure conditions, as it is low (about 5 mmHg maximum and typically <1 Ton) and very small (about 0.1%) compared to the partial pressure of the gas (see, e.g., Emel'yanenko et al., "Building Blocks for ionic liquids: Vapor pressures and vaporization enthalpies of 1-(n-alkyl)-imidazoles," *J. Chem. Thermodyn.*, 43:1500-1505 (2011); Verevkin et al., "Thermodynamics of Ionic Liquids Precursors: 1-Methylimidazole," *J. Phys. Chem. B*, 115: 4404-4411 (2011)). The respective errors associated with Henry's Constants (H) and volumetric solubility (S) were calculated based upon propagation of error of the experimental parameters (i.e., pressure, temperature, volumes, mass, etc.), in which all errors associated with the instrumentation were quantified. In this method, both the moles of gas dissolved in the liquid and the molecular weight of the gas are factors to consider in determining the magnitude of the uncertainty. As $CO_2$ is both more soluble and of a greater molecular weight than $CH_4$, measurements for $CO_2$ exhibit an order of magnitude smaller error than those for $CH_4$, with typical experimental errors of 1-2 and 10-15%, respectively. The errors for $CO_2$ solubility are consistent with those described above.

Henry's constants ($H_j$ (atm)) and volumetric solubilities ($S_j$) of $CO_2$ and $CH_4$ in 1-n-alkylimidazoles at temperatures between 30 and 75° C. are presented in Table 4.

Table 4 reveals that, at any given temperature, 1-methylimidazole exhibited the highest solubility of $CO_2$ and lowest solubility of $CH_4$ per volume. 1-Hexylimidazole displayed the greatest volumetric solubility of $CH_4$ under the same conditions. The solubility of both gases in each of the 1-n-alkylimidazoles decreased with increasing temperature. As a point of reference, molar solubility data are also presented in Table 1 as Henry's constants, and indicate that $CO_2$ is most soluble in 1-octylimidazole and 1-decylimidazole, while still indicating that $CH_4$ is most soluble in 1-hexylimidazole. However, the greater $CO_2$ solubility indicated by the smaller Henry's constants for larger 1-n-alkylimidazoles is primarily due to the >2 times increase in molecular weight between 1-methylimidazole and 1-octylimidazole (i.e., larger molar volume). Thus, the volumetric solubility data are useful in forming direct comparisons to conventional solvents, ILs, and polymers (Bara et al., "Guide to $CO_2$ Separations in Imidazolium-Based Room-Temperature Ionic Liquids," *Ind. Eng. Chem. Res.*, 48:2739-2751 (2009); Lin et al., "Materials selection guidelines for membranes that remove $CO_2$ from gas mixtures," *J. Mol. Struct.*, 739:57-74 (2005)).

The solubility data in Table 4 indicate that 1-methylimidazole also has the greatest working capacity of the 1-n-alkylimidazole solvents in terms of an absorption-regeneration process for $CO_2$ removal from $CH_4$ using a physical solvent. The about 60% decrease in $CO_2$ solubility between 30 and 75° C. indicates that $CO_2$ can easily be desorbed from the solvent under moderate heating and/or mild vacuum.

With increasing chain lengths in 1-n-alkylimidazoles, it was observed that $CH_4$ solubility ($SCH_4$) increased from 1-methylimidazole to 1-hexylimidazole, yet declined in 1-octylimidazole and 1-decylimidazole. Although the overall solvent environments are much less polar in 1-octylimidazole and 1-decylimidazole than in 1-ethylimidazole, these solvents exhibit similar levels of $CH_4$ uptake. These trends indicate that greater hydrocarbon content does not necessarily

TABLE 4

| 1-n-alkylimidazole | Temp | $H_{CO2}$ (atm) | ±[a] | $S_{CO2}$[b] | ±[a] | $H_{CH4}$ (atm) | ±[a] | $S_{CH4}$[b] | ±[a] |
|---|---|---|---|---|---|---|---|---|---|
| 1 - Methyl | 30 | 121 | 2 | 2.45 | 0.04 | 1920 | 270 | 0.14 | 0.02 |
|  | 45 | 180 | 3 | 1.61 | 0.03 | 2140 | 300 | 0.13 | 0.02 |
|  | 60 | 221 | 4 | 1.24 | 0.02 | 2300 | 340 | 0.12 | 0.02 |
|  | 75 | 254 | 5 | 1.08 | 0.02 | 2420 | 380 | 0.11 | 0.02 |
| 2 - Ethyl | 30 | 114 | 1 | 2.14 | 0.03 | 1240 | 150 | 0.19 | 0.02 |
|  | 45 | 153 | 2 | 1.52 | 0.02 | 1470 | 210 | 0.16 | 0.02 |
|  | 60 | 180 | 3 | 1.24 | 0.02 | 1630 | 240 | 0.14 | 0.02 |
|  | 75 | 201 | 3 | 1.12 | 0.02 | 1760 | 280 | 0.13 | 0.02 |
| 3 - Butyl | 30 | 86.3 | 0.9 | 2.07 | 0.03 | 584 | 39 | 0.27 | 0.02 |
|  | 45 | 123 | 1 | 1.45 | 0.02 | 616 | 42 | 0.25 | 0.02 |
|  | 60 | 150 | 2 | 1.15 | 0.02 | 638 | 43 | 0.24 | 0.02 |
|  | 75 | 170 | 2 | 1.01 | 0.02 | 656 | 43 | 0.23 | 0.02 |
| 4 - Hexyl | 30 | 69.8 | 0.7 | 2.08 | 0.03 | 462 | 27 | 0.30 | 0.02 |
|  | 45 | 98.3 | 1.1 | 1.46 | 0.02 | 511 | 32 | 0.26 | 0.02 |
|  | 60 | 118 | 2 | 1.16 | 0.02 | 545 | 35 | 0.24 | 0.02 |
|  | 75 | 134 | 2 | 1.02 | 0.02 | 572 | 37 | 0.23 | 0.02 |
| 5 - Octyl | 30 | 68.3 | 1.0 | 1.78 | 0.02 | 571 | 57 | 0.20 | 0.02 |
|  | 45 | 91.5 | 1.0 | 1.32 | 0.02 | 704 | 79 | 0.16 | 0.02 |
|  | 60 | 108 | 1 | 1.09 | 0.01 | 798 | 99 | 0.14 | 0.02 |
|  | 75 | 121 | 1 | 0.96 | 0.01 | 871 | 118 | 0.13 | 0.02 |
| 6 - Decyl | 30 | 63.3 | 1.0 | 1.61 | 0.03 | 501 | 55 | 0.19 | 0.02 |
|  | 45 | 91.3 | 1.6 | 1.14 | 0.02 | 624 | 77 | 0.16 | 0.02 |
|  | 60 | 111 | 2 | 0.90 | 0.02 | 712 | 100 | 0.14 | 0.02 |
|  | 75 | 127 | 3 | 0.77 | 0.02 | 779 | 120 | 0.12 | 0.02 |

[a] Error represents one standard deviation.
[b] S [=] ($cm^3$ gas (STP))($cm^3$ solvent)$^{-1}$ $atm^{-1}$.

favor $CH_4$ dissolution in this family of molecules, as increasing chain length must eventually limit the available space for $CH_4$ to dissolve.

Example 8

Comparison of 1-methylimidazole to Commercial Physical Solvent Processes and Ionic Liquids A general principle applied to selecting solvents for acid gas removal is that polar groups (ethers, nitriles, etc.) favor $CO_2$ dissolution and $CO_2/CH_4$ separation (see Bara et al., "Guide to $CO_2$ Separations in Imidazolium-Based Room-Temperature Ionic Liquids," *Ind. Eng. Chem. Res.*, 48:2739-2751 (2009); Lin et al., "Materials selection guidelines for membranes that remove $CO_2$ from gas mixtures," *J. Mol. Struct.*, 739: 57-74 (2005)). Thus, polar organic solvents (e.g., DMPEG, MeOH, etc.) are typically used for natural gas sweetening and other acid gas removal applications. However, a variety of factors are considered for a physical solvent to be used in a commercially viable process, including low volatility, low viscosity, stability, and availability in bulk at favorable costs. Furthermore, no one physical solvent is appropriate for every gas treating application, due to the differences in the gas streams to be treated and/or the requisite purity of the product gas. Four of the most utilized physical solvents are dimethyl ethers of poly(ethylene glycol) (DMPEG), propylene carbonate (PC), N-methyl-2-pyrrolidone (NMP), and methanol (MeOH), each with its own capabilities and limitations. A number of factors relating to solvent properties and the composition of the gas to be treated also play roles in determining solvent selection.

For example, DMPEG is effective at achieving selective separation of $H_2S$ from $CO_2$, but has a higher viscosity than other physical solvents, which reduces mass transfer rates, especially if operated below 25° C. PC is not typically recommended for use when high concentrations of $H_2S$ are present, as it becomes unstable during regeneration (about 93° C.). Of the solvents considered here, NMP has the highest selectivity for $H_2S/CO_2$, but is more volatile than DMPEG or PC. At ambient conditions, MeOH is quite volatile, but when chilled to subzero temperatures (as low as about −70.5° C.), MeOH becomes effective at near complete removal of $CO_2$, $H_2S$, and other contaminants. Chilling MeOH (or any physical solvent) increases acid gas loadings, but does so at the cost of the power supply for refrigeration and potential increases in solvent viscosity. However, these operating expenses can be offset via reduced solvent circulation rates (process footprint), which results in lower capital expenses. Also, as the solubility of $CH_4$ changes much less with temperature than does $CO_2$ (or other acid gases), selectivity enhancements can be achieved through chilling. While $CO_2$ and $H_2S$ are typically the impurities present in the greatest proportions, other minor species such as carbonyl sulfide (COS), carbon disulfide ($CS_2$), and mercaptans (RSH) can also be removed. Another consideration in solvent selection and process design is the absorption and loss of larger hydrocarbons, which can accumulate in the solvent. Thus, process designs can be quite different for each of these solvents depending on both solvent physical properties and the number of unit operations required.

Table 5 presents the physical properties most relevant to process operation for the four physical solvents discussed, as well as 1-methylimidazole. Ionic liquids (ILs) have also been included in this comparison. All physical properties are at 25° C., unless otherwise noted.

TABLE 5

|  | DMPEG | PC | NMP | MeOH | 1-methyl-imidazole | Ionic liquids |
|---|---|---|---|---|---|---|
| Viscosity (cP) | 5.8 | 3.0 | 1.65 | 0.6 | 1.77 | ~25-1000 |
| Specific gravity (kg m$^{-3}$) | 1030 | 1195 | 1027 | 785 | 1031 | 1000-1500 |
| Molecular weight (g mol$^{-1}$) | 280 | 102 | 99 | 32 | 82 | ~200-500 |
| Vapor pressure (mmHg) | 0.00073 | 0.085 | 0.40 | 125 | 0.37 | 0.000001 |
| Freezing point | −28 | −48 | −24 | −92 | −6 | Variable |
| Boiling point (760 mmHg) | 275 | 240 | 202 | 65 | 198 | N/A |
| Max. operating temp. (° C.) | 175 | 65 | bp | bp | bp[b] | Depends[a] |
| $CO_2$ solubility (ft$^3$ USgal$^{-1}$) | 0.485 | 0.455 | 0.477 | 0.425 | 0.377 | ≧0.335 |
| $CO_2/CH_4$ | 15 | 26 | 14 | 20[c] | >17 | 8-18 |
| $H_2S/CO_2$ | 8.82 | 3.29 | 10.2 | 7.06[c] | ≧NMP[b] | 2-4 |
| $H_2O$ miscible? | Yes | Partial | Yes | Yes | Yes | Varies |

"bp" = boiling point;
[a]Property depends on stability;
[b]Estimated value;
[c]Solubility selectivity data at −25° C. for MeOH.

Table 5 illustrates that 1-methylimidazole is most similar to NMP in terms of physical properties. Both NMP and 1-methylimidazole are about 50% less viscous than PC and about 70% less viscous than DMPEG. While 1-methylimidazole has about 20% lower $CO_2$ solubility than NMP and DMPEG, it has a higher $CO_2/CH_4$ selectivity than DMPEG and NMP. The potential for higher $H_2S/CO_2$ selectivity also exists in 1-methylimidazole based on analogy to the $CO_2/CH_4$ and $H_2S/CO_2$ ratios observed for NMP, and the presence of a basic, nitrogen center which has allowed its use as an acid scavenger, and should allow reversible acid-base interactions with the acidic proton(s) of $H_2S$. Table 5 demonstrates that 1-methylimidazole is useful for IGCC or pre-combustion $CO_2$ capture based on its selectivity for $H_2S/CO_2$.

Example 9

$CO_2$ Capture by Imidazoles and Amines

Figure 2:
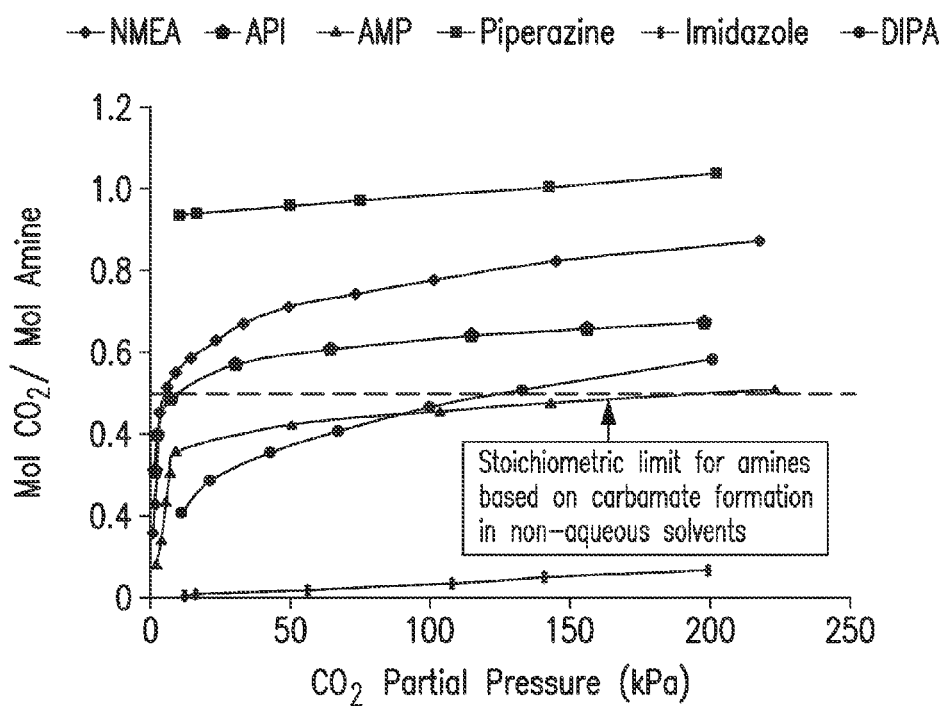
FIG. 2 is a graph depicting the relationship between $CO_2$ partial pressure and loading per initial amine molecule in 80:20 (v/v) 1-butylimidazole-amine mixtures at 25° C.

The utility of imidazoles for $CO_2$ capture applications was examined by studying mixtures of 1-butylimidazole with other amine-based compounds, including NMEA, API, AMP, piperazine, imidazole, and DIPA. Experiments were carried out, as described above and in Shannon et al., "Properties of alkylimidazoles as solvents for $CO_2$ capture and comparisons to imidazolium-based ionic liquids," *Ind. Eng. Chem. Res.*, 50:8665-8677 (2011), at ambient temperature (25° C.) and at $CO_2$ partial pressures between 5-225 kPa. The relationships between $CO_2$ absorbed and pressure for various 1-butylimidazole+amine combinations are presented in FIG. 2.

With the exception of 1-butylimidazole+imidazole, all combinations exhibited chemical reactions with $CO_2$ as evidenced by a sharp increase in loading of $CO_2$ at partial pressures about 10 kPa. In the case of piperazine, which was only sparingly soluble in 1-butylimidazole, high levels of $CO_2$ uptake were still achieved via rapid reaction of $CO_2$ with the well-mixed slurry. Piperazine was nearly stoichiometrically saturated with $CO_2$ in a 1:1 ratio prior to any appreciable pressure measurement could be obtained from the equipment. The slope of the line presented (nearly parallel to that of the mixture containing imidazole, which experienced no chemical reaction at all) is thus indicative of $CO_2$ physical solubility in 1-butylimidazole, as all of the piperazine has already been reacted with $CO_2$.

At loadings below about 0.35 mol $CO_2$/mol amine, 2-amino-2-methylpropanol (AMP) remained soluble in 1-butylimidazole and displayed a sharp increase in $CO_2$ absorbed at partial pressures about 10 kPa. However, above this loading, AMP-carbamate precipitated from solution and the relationship between loading and pressure became more representative of a physical solvent. Precipitation of AMP upon reaction with $CO_2$ is commonly observed in organic solvents where carbamate formation is favored, but not in aqueous solutions where carbonate formation is the preferred mechanism.

NMEA did not precipitate from solution upon absorption of $CO_2$, and exhibited the most favorable loading profile. At a partial pressure of 50 kPa, the 1-butylimidazole+NMEA mixture achieved a loading of 0.75 mol $CO_2$/mol NMEA. In non-aqueous solvent containing 2° amines, it would be expected that a level of 0.50 mol $CO_2$/mol amine could be achieved, with additional physical solubility occurring at increasing pressure. However, physical solubility in the 1-butylimidazole solvent at these relatively low $CO_2$ partial pressures could only account for a fraction (<20%) of the $CO_2$ absorbed in excess of the 0.50 mol $CO_2$/mol NMEA stoichiometric chemical reaction limit. By comparison of the slope of the data for 1-butylimidazolebimidazole, it appears that the combination of 1-butylimidazole+NMEA creates a synergistic effect on $CO_2$ uptake.

DIPA, a bulky, hindered 2° amine also exhibited absorption behavior similar to NMEA, but with less overall loading as the amine group is less accessible to $CO_2$ to form the carbamate.

Interestingly, API (an amine-imidazole hybrid) achieved a loading of 0.50 mol $CO_2$/mol —$NH_2$ group below 10 kPa, yet exhibited only physical solubility for $CO_2$ at increasing pressures. Based on a possible H' transfer mechanism, this behavior indicates that the carbamate formed between 2 molecules of API is not accessible to 1-butylimidazole to promote levels of $CO_2$ uptake similar to solvents containing NMEA, or as in the case of AMP, 1° amines with bulky side groups are less likely candidates to readily achieve loadings>0.50 per molecule of amine. With the exception of piperazine, which was a heterogeneous mixture, small alkanolamines, such as NMEA and MEA, can achieve the greatest $CO_2$ uptake in imidazole-based solvents.

For NMEA, API, and DIPA viscosities of the $CO_2$-rich mixtures at the maximum $CO_2$ loading were measured immediately after the experiments were completed. The results are summarized in Table 6.

TABLE 6

| Compound | Type | Viscosity (cP) of $CO_2$-rich solution (25° C.) |
|---|---|---|
| N-methylethanolamine (NMEA) | 2° alkanolamine | 28-31 |
| 1-(3-aminopropyl)-imidazole (API) | Imidazole—1° amine hybrid | 41 |
| Diisopropanolamine (DIPA) | Hindered 2° alkanolamine | 27-32 |

Interestingly, all of the $CO_2$-rich solvents had viscosities in the range of 30-40 cP, which represents an 8-10× increase from the viscosity of neat 1-butylimidazole at 25° C. The 1-butylimidazole+NMEA viscosity in the highly $CO_2$-rich state was only about1/3 that of a mixture containing 1-butylimidazole+MEA at a similar loading. Although viscosity increases with $CO_2$ absorption, the values observed are still less than most conventional ILs which cannot achieve high levels of $CO_2$ loading under these partial pressures and other reactive & reversible ILs (see, e.g., Bara et al., "Guide to $CO_2$ separations in imidazolium-based room-temperature ionic liquids," *Ind. Eng. Chem. Res.*, 48: 2739-2751 (2009); Gardas et al., "A group contribution method for viscosity estimation of ionic liquids," *Fluid Phase Equilibr.*, 266: 195-201 (2008)). Additionally, this viscosity range is approaching that of some aqueous amine solvents proposed for post-combustion $CO_2$ capture applications as well as solutions already commercially applied in the natural gas industry. Initial results indicate that further reductions in viscosity can be achieved with N-functionalized imidazoles with shorten pendant alkyl chains (e.g., 1-methylimidazole, 1,2-dimethylimidazole, etc.).

Figure 3:
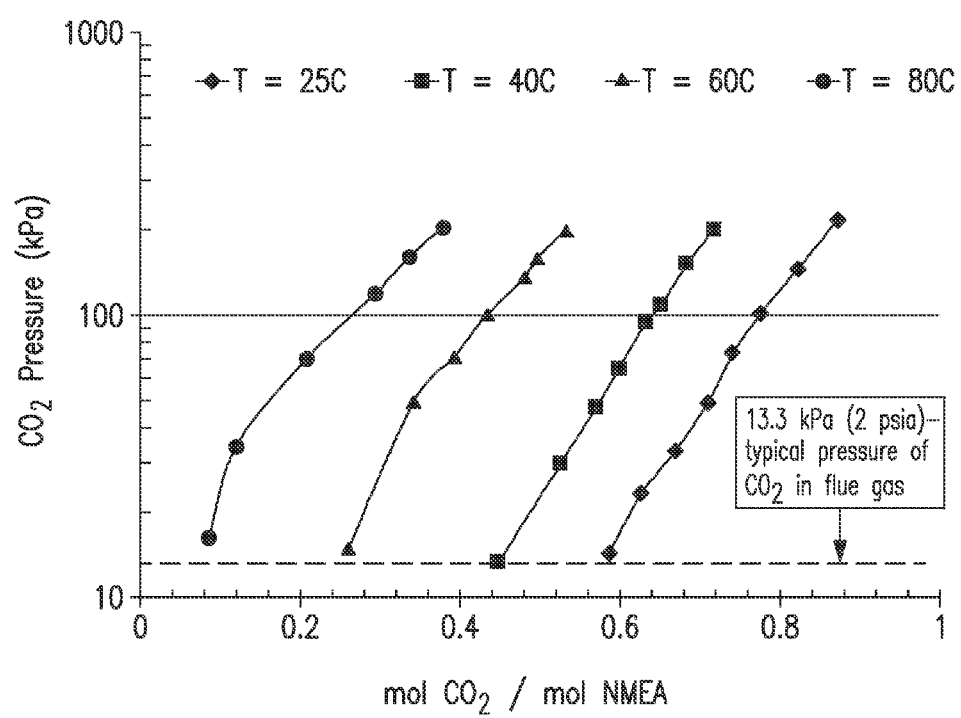
FIG. 3 is a graph depicting the relationship between $CO_2$ partial pressure and loading in 80:20 (v/v) 1-butylimidazole+ N-methylethanolamine (NMEA) mixtures at temperatures between 25-80° C.

Based on the performance of the 1-butylimidazole+NMEA mixture at ambient temperature, the temperature dependence of loading was characterized in order to generate baseline data for both absorption and desorption in imidazolebamine mixtures. FIG. 3 presents these data across the range of 25-80° C. at pressures>10 kPa. For typical flue gas conditions (40° C., 2 psia $CO_2$), the 1-butylimidazole+NMEA solvent achieves loadings approaching 0.50 mol $CO_2$/mol amine. As can be seen in FIG. 3, $CO_2$ solubility decreases with increasing temperature for a given pressure. The 1-butylimidazole+NMEA mixture exhibits a working capacity of about 0.40 mol $CO_2$/mol NMEA at a constant pressure when the temperature is increased from 40° C. to 80° C. These data, combined with the relatively low viscosity in the $CO_2$-rich state, indicate that imidazole+amine solvents are capable of both the capture and release of $CO_2$ within a conventional absorber-stripper process.

As a wide variety of imidazole and amine derivatives might be used in various concentrations to formulate solvent mixtures $CO_2$ capture, this particular combination of 1-butylimidazole+NMEA (80:20 vol:vol) is only a representative example. Both the structures of the imidazole and amine components are likely to influence both physical and chemical properties of the resultant solvent mixture.

Example 10

Imidazoles as Agents for $SO_2$ Removal

Alkylimidazoles can also be used to reversibly absorb $SO_2$ via both physical and chemical interactions. This feature presents interesting possibilities as alkylimidazoles could be used as both a chemical and physical solvent to recover $SO_2$ from flue gas.

To demonstrate absorption of $SO_2$ in an alkylimidazole solvent, an experiment was carried out in a well-ventilated fume hood. A handheld $SO_2$ sensor was also employed to ensure exposure of personnel to $SO_2$ was minimized. 1-Hexylimidazole (5.00 g, 32.8 mmol) was stirred in a 50 mL round bottom flask contained within a room-temperature water bath. Low pressure $SO_2$ (about 1 psig) was bubbled into the solvent, and the total solution volume was observed to expand rapidly with a single liquid phase present. After 5 minutes of exposure to the bubbling $SO_2$ stream, the mass of the flask contents was observed to increase by 2.46 g, indicating that 38.4 mmol or 1.17 mol $SO_2$/mol 1-hexylimidazole were present in the flask. After the flow of the $SO_2$ stream ceased, the contents of the flask were swept with a stream of $N_2$ for several hours at room temperature. After this time, the liquid phase had transformed to a transparent, viscous gel, containing about 0.5 mol $SO_2$/mol 1-hexylimidazole as determined by the residual mass of the flask contents. The $SO_2$ lost is likely the portion that was physically dissolved, thus indicating that $SO_2$ reacts with alkylimidazoles in a 1:2 ratio. The chemically-bound $SO_2$ could be released by heating the sample at >100° C. while under $N_2$ sweep. No irreversible degradation of the 1-hexylimidazole was observed via $^1H$ NMR.

While 1-hexylimidazole was chosen for convenience of its very low volatility, this reaction could have been carried out with any alkylimidazole compound. Thus, it is likely that the properties of the reaction product (i.e., viscosity and solid/liquid/gel state) between $SO_2$ and imidazoles will likely depend on the length of the alkyl chain as well as any additional functionalization at the C(2), C(4), and/or C(5) positions. Functionalization of the carbon positions can also provide the ability to tune the equilibrium of the chemical reaction or control desorption temperature.

As with the 1-butylimidazole+NMEA mixture for $CO_2$ capture, the example of 1-hexylimidazole is not optimized. However, N-functionalized imidazoles present new opportunities for reversible $SO_2$ capture from flue gas in the electric power industry. Reversible $SO_2$ capture is of interest as current "scrubbing" technologies rely on the reaction of $SO_2$+ $CaSO_3$ ($CaSO_3$, with $CaSO_3$ then oxidized to $CaSO_4$ and commonly sold for use as drywall). Direct recovery of $SO_2$ eliminates process engineering issues with the handling of solids in flue gas desulfurization, while simultaneously allowing for the production of higher value sulfur products such as $H_2SO_4$.

Additional opportunities exist in applying imidazoles for $H_2S$ removal through an acid-base reaction similar to that exhibited by anhydrous amines. As the pKa of the first proton dissociation for $H_{2S}$ is about 7.0, 1,2-dialkylimidazoles and 1,2,4-triaklyimidazoles are capable of near quantitative deprotonation of $H_{2S}$ to form an imidazolium bisulfide salt.

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods and combinations of various features of the compounds and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method for removing carbon dioxide from a stream, comprising:
    contacting the stream with a solvent system comprising an N-functionalized imidazole and an amine to capture the carbon dioxide,
    wherein the N-functionalized imidazole is non-ionic under neutral conditions and the N-functionalized imidazole and amine comprises more than 97% by weight of the solvent system.

2. The method of claim 1, wherein the N-functionalized imidazole is with shorten pendant alkyl chains.

3. The method of claim 1, wherein the N-functionalized imidazole has the following structure:

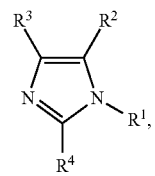

wherein
    $R^1$ is substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, cyano, or nitro; and
    $R^2$, $R^3$, and $R^4$ are each independently selected from hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, cyano, or nitro.

4. The method of claim 1, wherein the amine is selected from the group consisting of primary amines, secondary amines, tertiary amines, cyclic amines, monoamine, diamine, polyamine and mixtures thereof.

5. The method of claim 4, wherein the primary amine is selected from the group consisting of monoethanolamine, diglycolamine, 2-amino-2-methylpropanol, and mixtures thereof, the secondary amine is selected from the group consisting of diethanolamine, diisopropanolamine, and mixtures thereof, the tertiary amine is N-methyldiethanolamine, and the cyclic amine is substituted or unsubstituted piperazine.

6. The method of claim 1, wherein the amine has the following structure:

$$R^3-\underset{\underset{R^2}{|}}{\overset{R^1}{N}}$$

wherein
R$^1$, R$^2$, and R$^3$ are each independently selected from the group consisting of hydrogen, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, cyano, or nitro.

7. The method of claim 1, wherein the amine is selected from the group consisting of N-methylethanolamine, monoethanolamine, and mixtures thereof.

8. The method of claim 1, wherein the N-functionalized imidazole comprises at least 10% by weight of the solvent system.

9. The method of claim 1, wherein the amine comprises at least 10% by weight of the solvent system.

10. The method of claim 1, wherein the N-functionalized imidazole and the amine are present in a weight ratio from 9:1 to 1:9.

11. The method of claim 1, wherein the solvent system is substantially free from volatile compounds.

12. The method of claim 1, wherein the viscosity of the N-functionalized imidazole is less than 10 cP at 24° C.

13. The method of claim 1, wherein the carbon dioxide is captured through the formation of carbamate-imidazolium salt between the carbon dioxide and the N-functionalized imidazole and amine.

14. The method of claim 13, wherein the carbamate-imidazolium salt releases carbon dioxide upon heating and forms the regenerated solvent system.

15. A method for removing carbon dioxide, sulfur dioxide, or hydrogen sulfide from a stream, comprising:
  contacting the stream with a solvent system comprising an N-functionalized imidazole,
  wherein the N-functionalized imidazole is non-ionic under neutral conditions, and the N-functionalized imidazole comprises at least 50% by weight of the solvent system.

16. The method of claim 15, wherein the N-functionalized imidazole is with shorten pendent alkyl chains.

17. The method of claim 15, wherein the N-functionalized imidazole has the following structure:

[imidazole ring with substituents R$^2$, R$^3$, R$^4$ and R$^1$ on N]

wherein
R$^1$ is substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, cyano, or nitro; and
R$^2$, R$^3$, and R$^4$ are each independently selected from hydrogen, halogen, hydroxyl, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, cyano, or nitro.

18. The method of claim 15, wherein the solvent system further comprises an amine.

19. The method of claim 18, wherein the amine is selected from the group consisting of primary amines, secondary amines, tertiary amines, cyclic amines, monoamine, diamine, polyamine and mixtures thereof.

20. The method of claim 19, wherein the primary amine is selected from the group consisting of monoethanolamine, diglycolamine, 2-amino-2-methylpropanol, and mixtures thereof, the secondary amine is selected from the group consisting of diethanolamine, diisopropanolamine, and mixtures thereof, the tertiary amine is N-methyldiethanolamine, and the cyclic amine is substituted or unsubstituted piperazine.

21. The method of claim 19, wherein the amine is selected from the group consisting of N methylethanolamine, monoethanolamine, and mixtures thereof.

22. The method of claim 18, wherein the amine has the following structure:

$$R^3-\underset{\underset{R^2}{|}}{\overset{R^1}{N}}$$

wherein
R$^1$, R$^2$, and R$^3$ are each independently selected from the group consisting of hydrogen, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, cyano, or nitro.

23. The method of claim 18, wherein the amine comprises at least 10% by weight of the solvent system.

24. The method of claim 15, wherein the N-functionalized imidazole and the amine are present in a weight ratio from 9:1 to 1:1.

25. The method of claim 15, wherein the solvent system is substantially free from volatile compounds.

26. The method of claim 15, wherein the viscosity of the N-functionalized imidazole is less than 10 cP at 24° C.

27. The method of claim 15, wherein the stream is a gas stream or a liquid stream.

28. The method of claim 27, wherein the gas stream is a natural gas stream or a flue gas stream.

29. A method for sweetening a natural gas feed stream, comprising:
    contacting the natural gas feed stream with a solvent system comprising an N-functionalized imidazole, wherein the N-functionalized imidazole is non-ionic under neutral conditions and comprises at least 50% by weight of the solvent system, to form a purified natural gas feed stream and a gas-rich system; and
    separating the purified natural gas feed stream from the gas-rich system.

30. The method of claim 29, wherein the solvent system further comprises an amine.

31. The method of claim 29, further comprising contacting the natural gas feed stream with a second solvent system comprising an N-functionalized imidazole, wherein the N-functionalized imidazole is non-ionic under neutral conditions.

32. The method of claim 31, wherein the second solvent system further comprises an amine.

33. The method of claim 29, further comprising regenerating the solvent system.

34. The method of claim 33, wherein the solvent system is regenerated by heating or depressurizing the gas-rich system.

35. A solvent system for capturing volatile compounds, comprising:
    at least 50% by weight of an N-functionalized imidazole, wherein the N-functionalized imidazole is non-ionic under neutral conditions; and
    the volatile compound is selected from the group consisting of carbon dioxide, hydrogen sulfide, sulfur dioxide, nitrogen oxide, nitrogen dioxide, carbonyl sulfide, carbon disulfide, and mixtures thereof.

36. The solvent system of claim 35, further comprising an amine.

37. The solvent system of claim 36, wherein the N-functionalized imidazole and the amine are present in a weight ratio from 9:1 to 1:1.

38. The solvent system of claim 36, wherein the N-functionalized imidazole and amine comprises more than 97% by weight of the solvent system.

39. The solvent system of claim 36, wherein the N-functionalized imidazole is 1-butylimidazole and the amine is N-methylethanolamine (NMEA).

40. The solvent system of claim 35, wherein the viscosity of the system is less than 20 cP at 24° C.

41. The solvent system of claim 35, wherein the N-functionalized imidazole is with shorten pendent alkyl chains.

42. The solvent system of claim 35, wherein the N-functionalized imidazole is selected from a group consisting of 1,2-dimethyl, 1-n-methyl, ethyl, propyl, butyl, pentyl, hexyl, octyl, decyl, dodecyl, tetradecyl imidazole, and a combination thereof.

43. The solvent system of claim 35, wherein the N-functionalized imidazole is 1,2-dimethyl imidazole.

* * * * *